United States Patent
Günlü et al.

(10) Patent No.: US 12,335,415 B2
(45) Date of Patent: Jun. 17, 2025

(54) METHOD AND SYSTEM FOR DECORRELATING INPUT SIGNALS FROM A PHYSICAL IDENTIFIER

(71) Applicant: TECHNISCHE UNIVERSITÄT BERLIN, Berlin (DE)

(72) Inventors: Onur Günlü, Berlin (DE); Rafael F. Schaefer, Berlin (DE)

(73) Assignee: TECHNISCHE UNIVERSITÄT BERLIN, Berlin (DE)

( * ) Notice: Subject to any disclaimer, the term of this patent is extended or adjusted under 35 U.S.C. 154(b) by 0 days.

(21) Appl. No.: 17/911,581

(22) PCT Filed: Mar. 22, 2021

(86) PCT No.: PCT/EP2021/057263
§ 371 (c)(1),
(2) Date: Sep. 14, 2022

(87) PCT Pub. No.: WO2021/191144
PCT Pub. Date: Sep. 30, 2021

(65) Prior Publication Data
US 2024/0305480 A1 Sep. 12, 2024

(30) Foreign Application Priority Data

Mar. 23, 2020 (EP) ..................................... 20164810

(51) Int. Cl.
*H04L 9/32* (2006.01)
(52) U.S. Cl.
CPC .................................. *H04L 9/3278* (2013.01)
(58) Field of Classification Search
CPC ................................ H04L 9/3278; H04L 9/32
See application file for complete search history.

(56) References Cited

U.S. PATENT DOCUMENTS

2020/0193006 A1* 6/2020 Krieg .................... H04L 9/3236

OTHER PUBLICATIONS

Günlü Onur et al., "Reliable secret key generation from physical unclonable functions under varying environmental conditions", 2015 IEEE International Workshop on Information Forensics and Security (WIFS), IEEE, Nov. 16, 2015 (Nov. 16, 2015), pp. 1-6, XP032840426, DOI:10.1109/WIFS.2015.7368554, sections II, III, IV; figure 1.

(Continued)

*Primary Examiner* — Quazi Farooqui
(74) *Attorney, Agent, or Firm* — Harness, Dickey & Pierce, P.L.C.

(57) ABSTRACT

The present disclosure refers to a method for decorrelating input signals from a physical identifier. In a system having one or more processors, the method comprises: providing input signals from a physical identifier: providing a decorrelation matrix; generating output signals, comprising decorrelating the input signals by applying the decorrelation matrix to the input signals; and providing the output signals at an output. The providing of the decorrelation matrix comprises: providing an initial matrix, the initial matrix being an orthogonal matrix; and determining the decorrelation matrix from the initial matrix by at least once selecting and applying at least one of a plurality of matrix extensions on the initial matrix, wherein each of the plurality of matrix extensions generates, from an input orthogonal matrix, a further orthogonal matrix with higher matrix dimension than the input orthogonal matrix. Furthermore, a system for decorrelating input signals from a physical identifier is provided.

9 Claims, 3 Drawing Sheets

(56) References Cited

OTHER PUBLICATIONS

Chanyul Kim et al., "Low Computational Complexity Variable Block Size (VBS) Partitioning for Motion Estimation Using the Walsh Hadamard Transform (WHT)", Multimedia, 2009. ISM '09. 11th IEEE International Symposium on, IEEE, Piscataway, NJ, USA, Dec. 14, 2009 (Dec. 14, 2009), pp. 124-129, XP031589063, ISBN: 978-1-4244-5231-6, Section II.

Günlü Onur et al., "Secure and Reliable Key Agreement with Physical Unclonable Functions", arxiv.org, Cornell University Library, 201 Olin Library Cornell University Ithaca, NY 14853, Feb. 26, 2020 (Feb. 6, 2020), XP081608726, DOI: 10.3390/E20050340 cited in the application section 3; figure 2.

International Search Report and Written Opinion of the ISA issued in PCT/EP2021/057263, mailed Jun. 10, 2021; ISA/EP.

European Search Report issued in EP20164810.2, mailed on Aug. 7, 2020, 9 pages.

\* cited by examiner

METHOD AND SYSTEM FOR DECORRELATING INPUT SIGNALS FROM A PHYSICAL IDENTIFIER

CROSS-REFERENCE TO RELATED APPLICATIONS

This application is a 371 U.S. National Phase of International Application No. PCT/EP2021/057263, filed on Mar. 22, 2021, which claims priority to European Patent Application No. 20164810.2 filed on Mar. 23, 2020. The entire disclosures of the above applications are incorporated herein by reference.

The present disclosure refers to a method and a system for decorrelating input signals from a physical identifier.

BACKGROUND

Physical identifiers such as physical unclonable functions (PUFs) are heuristically defined to be complex challenge response mappings that depend on the random variations in a physical object. Uniformly random sequences are derived from this complex mapping, which can be used as a secret key. One important feature of PUFs is that the random sequence generated is not required to be stored and can be regenerated on demand. This property makes PUFs cheaper—as there is no requirement for a memory for secret storage—and safer—since the random sequence is regenerated on demand only—alternatives to other secret generation and storage techniques such as storing the secret key in a non-volatile memory (NVM).

The standard approach for key generation using PUFs can be divided into two parts: the PUF itself and a key generation module. While the PUF provides raw data, the key generation module extracts information from the data in order to generate a reliable key. The key generation module can be divided into a source coding part (comprising an N-to-2 multiplexer, counters, and a comparator with a one bit output) that extracts useful information from the PUF-circuits and a channel coding (or error correction) part that is used to satisfy the required block error probability for the extracted key. The main source coding idea in the standard approach is to choose a PUF-circuit pair and extract a bit 1 if the first PUF-circuit has a higher counter output and, otherwise, 0.

There are several issues with the standard approach. First, only one bit per PUF-circuit (e.g., ring oscillator (RO) pair, each of which has a semi-continuous output) is extracted. This is highly inefficient as multiple bits can be extracted from a semi-continuous output. From a continuous output, infinitely many bits are extractable in principle. Second, correlations between the PUF-circuit outputs also emerge at the extracted bits, which make the overall bit sequence vulnerable to machine learning attacks due to the correlations between the bits. Third, the channel encoder is designed for a correlated bit sequence measured through a channel with memory, which is not fully characterized by standard information theoretic metrics that are used in the literature to compare different key-extraction methods. One requires a discrete memoryless source (DMS) and a discrete memoryless channel (DMC) to apply standard information theory techniques.

In order to overcome such issues, a transform-coding based approach that replaces the N- to -2 multiplexer in the standard approach with an orthogonal transform (e.g., a discrete cosine transform (DCT), a discrete Walsh-Hadamard transform (DWHT), a discrete Haar transform (DHT), or a Karhunen-Loeve transform (KLT)) followed by a quantization step was developed (see Günlü et. al: "Secure and reliable key agreement with physical unclonable functions", MDPI Entropy Journal, vol: 20, no: 5, May 2018).

SUMMARY

It is an object of the present disclosure to provide improved technology for decorrelating input signals from a physical identifier with increased reliability and decreased complexity.

In order to solve the problem, a method for decorrelating input signals from a physical identifier is provided. Further, a system for decorrelating input signals from a physical identifier is provided. Additional aspects are disclosed in dependent claims.

According to one aspect, a method for decorrelating input signals from a physical identifier is provided. In a system having one or more processors, the method comprises: providing input signals from a physical identifier; providing a decorrelation matrix; generating output signals, comprising decorrelating the input signals by applying the decorrelation matrix to the input signals; and providing the output signals at an output. The providing of the decorrelation matrix comprises: providing an initial matrix, the initial matrix being an orthogonal matrix; and determining the decorrelation matrix from the initial matrix by at least once selecting and applying at least one of a plurality of matrix extensions on the initial matrix, wherein each of the plurality of matrix extensions generates, from an input orthogonal matrix, a further orthogonal matrix with higher matrix dimension than the input orthogonal matrix.

According to another aspect, a system for decorrelating input signals from a physical identifier is provided. The system comprises one or more processors configured to provide the following: provide input signals from a physical identifier; provide a decorrelation matrix; generate output signals, comprising decorrelating the input signals by applying the decorrelation matrix to the input signals; and provide the output signals at an output. The one or more processors are further configured for, in the step of providing the decorrelation matrix: providing an initial matrix, the initial matrix being an orthogonal matrix; and determining the decorrelation matrix from the initial matrix by at least once selecting and applying at least one of a plurality of matrix extensions on the initial matrix, wherein each of the plurality of matrix extensions generates, from an input orthogonal matrix, a further orthogonal matrix with higher matrix dimension than the input orthogonal matrix.

Within the context of the present disclosure, a real-valued matrix A is referred to as orthogonal if $A^T A = AA^T = 1$, wherein I is the identity matrix and $A^T$ denotes the transpose of a matrix A.

With the method, correlations in physical identifier circuit outputs, in particular physical unclonable function (PUF) circuit outputs, may be significantly reduced compared to one-bit extraction methods per PUF-circuit pair. Thus, security may be increased, in particular against machine learning attacks.

The generated decorrelation matrices (transform matrices) may provide similar and close to optimal decorrelation efficiency results, the choice of the decorrelation matrix therefore not imposing an extra security loss.

The method allows to design quantizers based on reliabilities of the output signals (also called transform coefficients) so that error-correcting codes and the quantizers can be jointly designed, which provides higher flexibility in quantizer design when an error-correcting code is given/fixed and vice versa.

When modeling each transform coefficient, samples from different chips with the same PUF-circuit design may be collected so that fitted models to noiseless transform coefficients are considering a whole (or available) set of chips that use the same PUF-circuit designs, in contrast to classic assumptions that raw noiseless PUF-circuit outputs in different chips are independent, which is not true for many PUF types.

It may be provided that an optimal decorrelation matrix providing the smallest (bit) error probability for a specific PUF type can be used. Thus, any gain in the error probability may further allow the error-correction code's decoder, which corrects the errors in the erroneous (noisy) bit sequence generated from noisy transform coefficients, to be significantly simpler (i.e., yielding lower complexity in terms of the hardware area, the main bottleneck for PUF applications). Thus, complexity may be further decreased and the secret-key size for a fixed number of bits extracted from the transform coefficients may be increased jointly.

The input signals may be semi-continuous or continuous. The input signals may be noisy or, alternatively, (essentially) noiseless. The input signals may be correlated.

For each application step, one matrix extension among the plurality of matrix extensions may be selected and applied. In particular, a first transformation of the plurality of transformations may be selected and applied on the initial (first) matrix. On a resulting second matrix, a selected second transformation of the plurality of transformations may be applied. Further, on a resulting third matrix, a selected third transformation of the plurality of transformations may be applied. Corresponding steps may be carried until a predetermined size for the decorrelation matrix is reached.

The method may be used for providing a secure and low-complexity source of a secret key for, e.g., secret key generation in a fifth generation (5G) mobile device via static random access memory (SRAM) outputs, device authentication and identification in a field programmable gate array (FPGA), intellectual property (IP) protection in hardware/software, encryption/decryption of data before data storage in a cloud or in a controller area network (CAN) bus standard used in modern vehicles to provide security against safety-critical attacks to the throttle and brake, Internet-of-Things (IoT) security and privacy, radio frequency identification (RFID) device security, non-repudiation (i.e., undeniable transmission or reception of data), proof of execution on a specific processor, and as a local source of randomness required in physical-layer security (PLS) applications such as secure transmission of a message over a wiretap channel.

The physical identifier may be a physical unclonable function (PUF). According to an embodiment, a physical unclonable function (PUF) is a physical object that for a given input (input signals) and conditions (challenge), provides a physically-defined "digital fingerprint" output (response, output signals) that serves as a unique identifier, often for a semiconductor device such as a microprocessor. PUFs, for example, may be based on unique physical variations which occur during semiconductor manufacturing. In general, a PUF is a physical entity embodied in a physical structure. PUFs may be implemented in integrated circuits and may be used in applications with high security requirements, more specifically cryptography.

The physical identifier may comprise ring oscillators (RO). The physical identifier may in particular be at least one of a ring oscillator PUF (RO-PUF), a static random-access memory (SRAM) PUF, a dynamic random-access memory (DRAM) PUF, a Butterfly PUF, a flash PUF, and a Memristor PUF.

The determining of the decorrelation matrix from the initial matrix may comprise (adaptively) selecting at least one of the plurality of transformations dependent on the input signals. The selecting may in particular be carried out dependent on physical identifier output statistics, in particular, a reliability performance with regard to the physical identifier. The selecting may be carried out dependent on the smallest error probability resulting from the physical identifier.

The initial matrix may be a 2×2 matrix. Alternatively, the initial matrix may be a 4×4 matrix or a 8×8 matrix.

It may be provided that for each extension of the plurality of matrix extensions, the input orthogonal matrix is a k×k matrix and the further orthogonal matrix is a 2 k×2 k matrix, k being a positive integer. Thus, by applying one of the plurality of matrix extensions, the matrix dimensions of the resulting further orthogonal matrix may be twice the dimensions of the input orthogonal matrix.

The decorrelation matrix determined from the initial matrix may be a $2^n \times 2^n$ matrix, n being a positive integer. The matrix dimension of the decorrelation matrix may thus be a power of two. This is particularly the case when the initial matrix is a 2×2 matrix and the matrix dimension is doubled by each application of one of the plurality of matrix extensions. In particular, the decorrelation matrix can be a 4×4, 8×8, 16×16, 32×32, 64×64, 128×128, 256×256, or 512×512 matrix.

The plurality of matrix extensions may comprise following mappings:

$A \mapsto [A, A; A, -A]$,
$A \mapsto [A, A; -A, A]$,
$A \mapsto [A, -A; A, A]$,
$A \mapsto [-A, A; A, A]$,
$A \mapsto [A, A; A, -A]$,
$A \mapsto [A, A; -A, A]$,
$A \mapsto [A, -A; A, A]$, and
$A \mapsto [-A, A; A, A]$, wherein A is the input orthogonal matrix. The input orthogonal matrix A may thus be transformed to a block matrix comprising matrix blocks of either A or −A. Each resulting block matrix [A, A; A, −A] to −[−A, A; A, A] may hence be an orthogonal matrix with higher matrix dimensions. Correspondingly, each of the plurality of matrix dimensions may be an orthogonality preserving transformation.

A matrix extension among the plurality of matrix extensions may be a negative version of another extension of the plurality of matrix extensions. In this case, operations for the negative version may be different from each positive version due to a signed representation of transform coefficient values, which can likely affect a total number of operations and required hardware area.

The initial matrix may be composed of matrix entries that are 1 or −1. Alternatively, the initial matrix may also comprise further real-valued matrix entries.

When using matrix entries that are 1 or −1, manufacturers are provided with a small set of well performing transforms in terms of decorrelation efficiency (related to secrecy leakage), hardware complexity, privacy leakage, and decoder design for chosen/fixed error-correcting codes. By using matrix entries that are 1 or −1, particularly small hardware areas may be achieved. Further, multiplications may be avoided because a matrix multiplication with matrix entries that are only 1 or −1 can be implemented by using addition operations in the hardware.

The initial matrix may be [1, 1; 1, −1]. Alternatively, the initial matrix may be one of [1, 1; −1, 1], [1, −1; 1, 1], [−1, 1; 1, 1], −[1, 1; 1, −1], −[1, 1; −1, 1], −[1, −1; 1, 1], or −[−1, 1; 1, 1].

The decorrelation matrix may be:

$$\begin{pmatrix} -1 & 1 & 1 & -1 & 1 & -1 & -1 & 1 & 1 & -1 & -1 & 1 & 1 & -1 & -1 & 1 \\ 1 & 1 & -1 & -1 & -1 & -1 & 1 & 1 & -1 & -1 & 1 & 1 & -1 & -1 & 1 & 1 \\ -1 & 1 & -1 & 1 & 1 & -1 & 1 & -1 & 1 & -1 & 1 & -1 & 1 & -1 & 1 & -1 \\ 1 & 1 & 1 & 1 & -1 & -1 & -1 & -1 & -1 & -1 & -1 & -1 & 1 & 1 & 1 & 1 \\ 1 & -1 & -1 & 1 & 1 & -1 & -1 & 1 & 1 & -1 & -1 & 1 & 1 & -1 & -1 & 1 \\ -1 & -1 & 1 & 1 & -1 & -1 & 1 & 1 & -1 & -1 & 1 & 1 & 1 & 1 & -1 & -1 \\ 1 & -1 & 1 & -1 & 1 & -1 & 1 & -1 & 1 & -1 & 1 & -1 & -1 & 1 & -1 & 1 \\ -1 & -1 & -1 & -1 & -1 & -1 & -1 & -1 & -1 & -1 & -1 & -1 & 1 & 1 & 1 & 1 \\ 1 & -1 & -1 & 1 & 1 & -1 & -1 & 1 & -1 & 1 & 1 & -1 & -1 & 1 & 1 & -1 \\ -1 & -1 & 1 & 1 & -1 & -1 & 1 & 1 & 1 & 1 & -1 & -1 & -1 & -1 & 1 & 1 \\ 1 & -1 & 1 & -1 & 1 & -1 & 1 & -1 & -1 & 1 & -1 & 1 & -1 & 1 & -1 & 1 \\ -1 & -1 & -1 & -1 & -1 & -1 & -1 & -1 & 1 & 1 & 1 & 1 & -1 & -1 & -1 & -1 \\ 1 & -1 & -1 & 1 & -1 & 1 & 1 & -1 & 1 & -1 & -1 & 1 & -1 & 1 & 1 & -1 \\ -1 & -1 & 1 & 1 & 1 & 1 & -1 & -1 & -1 & -1 & 1 & 1 & -1 & -1 & 1 & 1 \\ 1 & -1 & 1 & -1 & -1 & 1 & -1 & 1 & 1 & -1 & 1 & -1 & 1 & -1 & 1 & -1 \\ -1 & 1 & -1 & -1 & 1 & 1 & 1 & 1 & -1 & -1 & -1 & -1 & -1 & -1 & -1 & -1 \end{pmatrix}$$

The output signals may be post-processed, in particular using at least one of histogram equalization, quantization, bit allocation, and concatenation. A bit sequence $X^n$ (or its noisy version $Y^n$) used in key agreement methods such as fuzzy commitment scheme (FCS) may be extracted from the output signals. The output signals may be post-processed for enrollment, when an encoder observes the bit sequence $X^n$ to extract a secret key and public side information. The output signals may also be post-processed for reconstruction, when a decoder observes $Y^n$ and the public side information to extract the same key as the encoder. During enrollment, design parameters may be chosen as a function of source and noise statistics by a device manufacturer.

Alternatively, a 4-point (4P)-two-dimensional (2D) transforms may be applied that take four inputs $[X_0, X_1, X_2, X_3]$ and calculates the transform coefficients, e.g., for one of the matrix extensions in the plurality of matrix extensions obtained, as $$T_0 = X_0 + X_1 + X_2 + X_3,$$
$$T_1 = X_0 - X_1 + X_2 - X_3,$$
$$T_2 = X_0 + X_1 - X_2 - X_3,$$
$$T_3 = X_0 - X_1 - X_2 + X_3.$$

Successively the 4P-2D transforms may be applied to the 16×16 RO array and implement a finite state machine (FSM) to control the input and output AXI streaming interfaces as well as the successive application order for the 4P-2D. The building blocks may comprise at least one of the following: a data random access memory (RAM) to store all array elements; a 32-bit index read-only memory (ROM), where each word stores four 8-bit array-element addresses; a multiplexer (MUX) to select the RAM address to be accessed; a second MUX to select the ROM input; and a register for each input to convey different RAM words to different ports.

All RO outputs may be first stored in the data RAM. Then, the first word of the index ROM is fetched. This word holds the addresses of four array elements to be loaded. These array elements are passed to the 4P-2D transforms' input registers by selecting the corresponding port in the address MUX and register bank. After evaluating the 4P-2D transform once, the new array elements $[Y_0, Y_1, Y_2, Y_3]$ may be written back to the locations from where the inputs $[X_0, X_1, X_2, X_3]$ were fetched. The FSM performs the same steps for all remaining ROM words and conveys the final 16×16 2D transform coefficients to the AXI output port.

The addition and subtraction operations on four numbers in each 4P-2D transform evaluation requires at most two additional bits, while the subsequent bit shift to implement the division by 2 removes one bit. Since the 4P-2D transform is applied in total four times to each RAM location, the transform requires 20-bit operations and storage in order to process the 16-bit signed numbers used for counter values.

DESCRIPTION OF FURTHER EMBODIMENTS

In the following, embodiments, by way of example, are described with reference to figures. In the figures, show.

Figure 1:
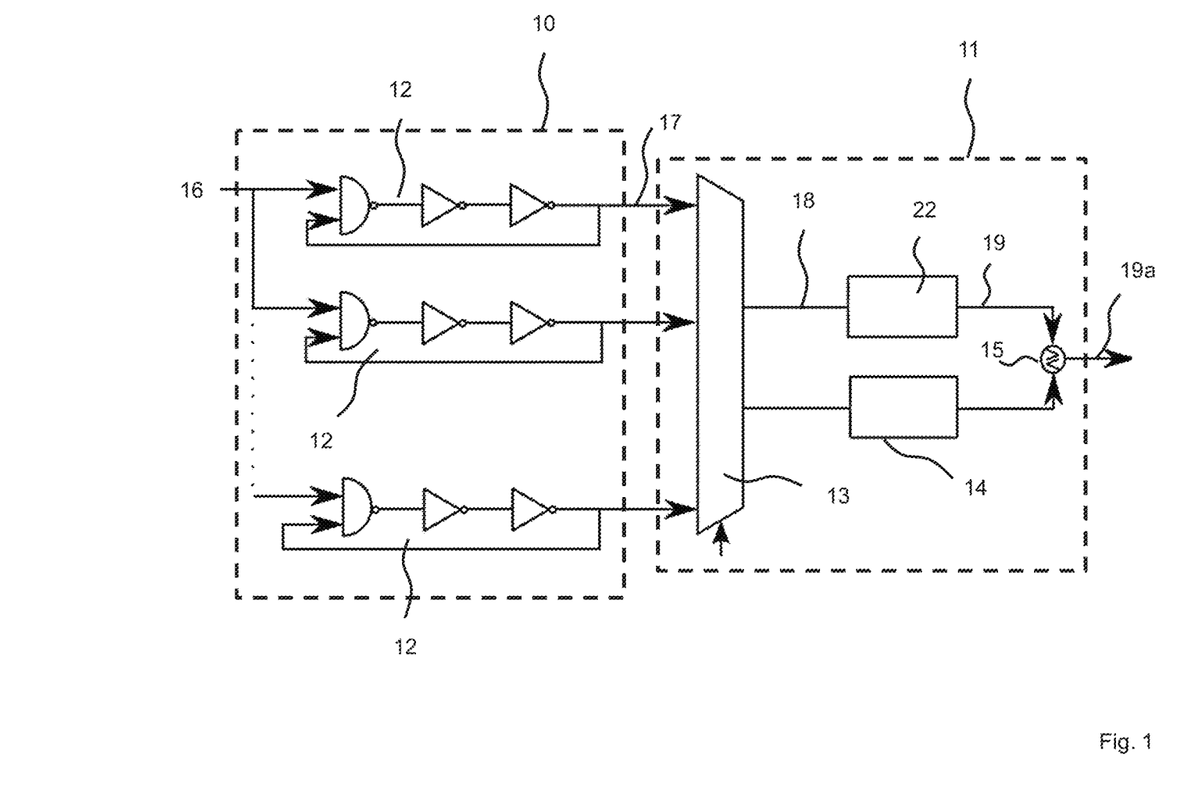
FIG. 1 a graphical representation of an arrangement for key generation according to the state of the art.

FIG. 1 shows a graphical representation of an example for an arrangement for key generation. The arrangement comprises a physical unclonable function (PUF) module 10 and a key generation module 11. The PUF module 10 comprises a plurality (N) ring oscillators 12. The key generation module 11 comprises an N-to-2 multiplexer 13, counters 14, and a comparator 15.

The ring oscillators 12 are activated by an enable signal 16 and subsequently provide PUF signals 17 to the multiplexer 13. The multiplexer 13 outputs multiplexed signal pairs 18 to the counters 14, which in turn provide further signals 19 to the comparator 15. In the standard approach, a PUF-circuit pair is selected by an N-to-2 multiplexer 13, and a 1-bit is provided by the comparator 15 as output signal 19a if a first PUF-circuit has a higher counter output than a second PUF circuit and a 0-bit as output signal 19a, otherwise.

Figure 2:
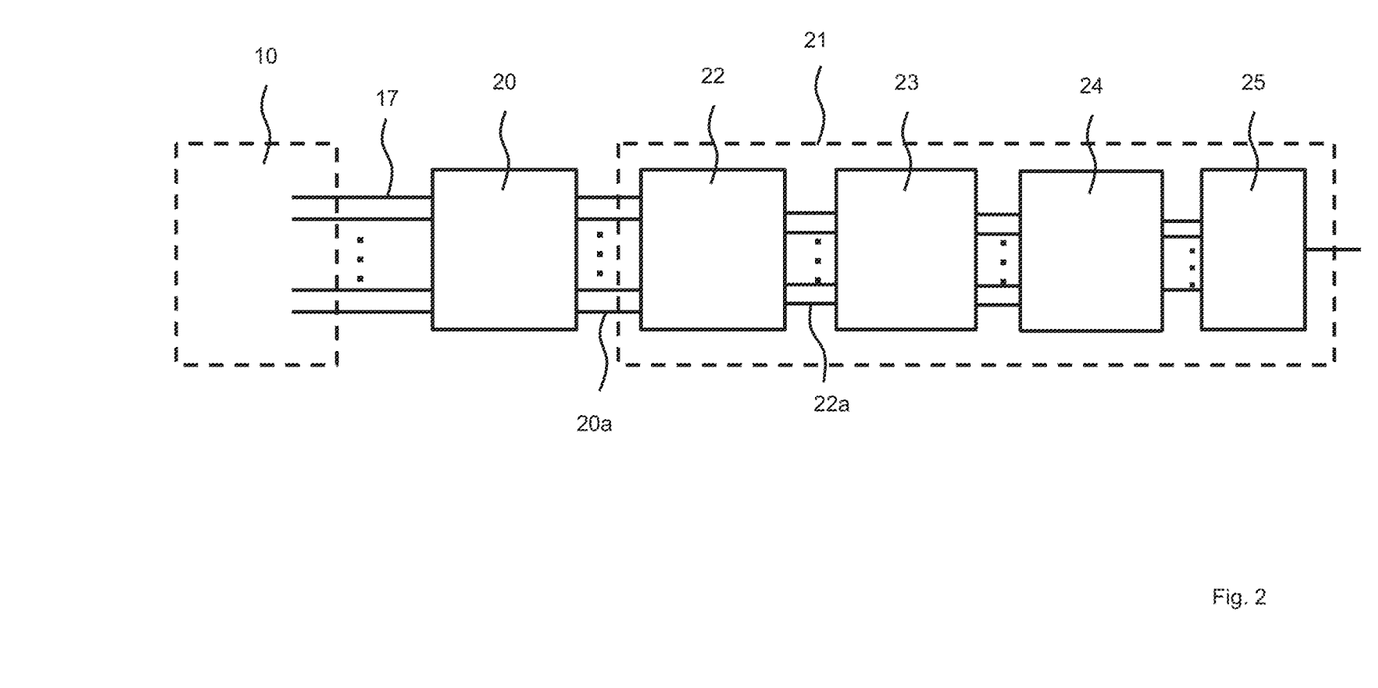
FIG. 2 a graphical representation of an arrangement for decorrelating PUF signals.

FIG. 2 shows a graphical representation of an arrangement for decorrelating PUF signals, comprising a PUF module 10, a decorrelation module 20 (provided with, for example, one or more processors), and a post-processing module 21. The post-processing module 21 comprises a histogram equalization module 22, a quantization module 23, a bit allocation module 24, and a concatenation module 25.

The PUF module 10 outputs correlated PUF signals 17, which may be represented by vectors. The correlations may be due to, e.g., surrounding logical elements. The PUF signals 17 are decorrelated in the decorrelation module 20 to output signals 20a.

The histogram equalization module 22 converts the probability density of each of the output signals 20a (transform coefficients) into a standard normal distribution so that subsequent quantization steps for all of the output signals 22a are thus the same. Without histogram equalization, a different quantization procedure for each of the output signals 20a would be necessary. Therefore, performing histogram equalization reduces storage in the quantization module 23.

The different modules referred to above may be provided by hardware implementation in combination with one or more software applications.

Equalized signals 22a are independent if the PUF signals 17 are perfectly decorrelated in the decorrelation module 20 and are jointly Gaussian. Thus, in this case, a scalar quantizer in the quantization module 23 can be employed without performance loss. A scalar quantizer and a bit extraction method in the bit allocation module 24 that satisfies security and reliability requirements may be provided with the independence assumption for the output signals 20a and the equalized signals 22a. The bit allocation module 24 may comprise a Gray mapping, ensuring neighboring quantization intervals to result in only 1-bit changes. The concatenation module 25 sequentially collects all bits allocated by the bit allocation module 24 and concatenates them to obtain a single bit sequence as the output.

Following table shows hardware implementation results for decorrelating PUF signals using the method in comparison with a benchmark design (PUFKY/ROPUF). A two-dimensional (2D) 16×16 DWHT with a one-bit quantizer for all transform coefficients was implemented (Proposed-DWHT). The DWHT has elements 1 and −1 in its transform matrix. Therefore, the results in the table are closely approximating the hardware complexity of the proposed decorrelation module 20. In the table, the number of used lookup tables (LUT), registers, multiplexers (MUXes), random access memory (RAM), read-only memory (ROM), and configurable logic blocks (CLBs) or slices that comprise a collection of basic logic blocks in an FPGA are listed in addition to the computation duration/delay.

approximately 1.68 ms, which is significantly better than a processing delay of the PUFKY/ROPUF hardware implementation.

Conducted experiments suggest that a decorrelation efficiency of each transform is high and close to optimal. In addition, the method to be applied to any correlated PUF-circuit output provides a flexible way for determining and implementing the best decorrelation matrix.

Implementation can be carried out by minor adaptations. Each decorrelation module chosen from the set of transforms obtained using the matrix extensions will likely result in a similar hardware area; and reliability will be maximized so that error-correcting code's decoder, which corrects the errors in the noisy bit sequence obtained from the noisy transform coefficients to reconstruct the secret key generated from the noiseless transform coefficients, is simplified.

A linear gain in the reliability will provide a significantly higher (nonlinear due to nonlinearity of the capacity of a binary symmetric channel (BSC)) gain in terms of secret-key rate (or channel coding rate) of the chosen error-correcting code. This provides flexibility to use a lower-complexity decoder or to extract more secret-key bits for a fixed number of extracted PUF bits.

The error probabilities are estimated using following setup. A ring oscillator (RO) dataset consisting of measurements from 193 different Xilinx Sparten (XC3S500E) chips with 16×16 arrays, i.e., 256 RO outputs in each chip, was provided. Among 256 transform coefficients, only 255 coefficients are used since a first coefficient (corresponding to a DC coefficient that is the coefficient at the zero frequency in the frequency domain), corresponds to an average RO output over the PUF array in a device, which is generally known by an eavesdropper. A resulting RO dataset consists of 100 noisy measurements of each RO.

In order to estimate the error probabilities, following steps are carried out:
  Mean values are calculated for each RO from 100 noisy measurements to estimate the noiseless RO outputs as each noisy RO output is modeled as noiseless RO output added by a noise component with zero mean. The zero mean random noise model fits well to the digital circuits mainly due to the random (or uncontrollable) local temperature and voltage variations in digital chips.
  For each chip with a 16×16 RO array with the same circuit design, a chosen decorrelation matrix (transform matrix) is applied to the noiseless RO outputs to determine the noiseless transform coefficients. The same transform is applied to each chip's noiseless RO

| Blocks | LUTs | Registers | MUXes | RAM & ROM (Byte) | Slices | Duration (µs) |
|---|---|---|---|---|---|---|
| Proposed-ROs | 1632 | 397 | 65 | 0 | 729 | 1600 |
| Proposed-DWHT | 326 | 200 | 0 | 1664 | 99 | 66 |
| Proposed-Quantizer | 43 | 39 | 0 | 638 | 21 | 14 |
| Proposed (ROPUF) | 2001 | 636 | 65 | 2302 | 849 | 1680 |
| PUFKY (ROPUF) | n.a. | n.a. | n.a. | n.a. | 952 | 4611 |

The table illustrates the strength of the method with elements +1 and −1. Further, proposed-RO-PUF occupies an approximately 11% smaller than the benchmark PUFKY/ROPUF hardware implementation in terms of the number of slices used. This result can be further improved. Furthermore, the overall processing time of the proposed design is outputs. Thus, for each transform coefficient, 193 samples are obtained, each of which originates from one chip among 193 chips in the used dataset.
Mean and variance values for each noiseless transform coefficient (in total 255) are estimated by using the transform coefficients obtained from each chip's noiseless RO outputs.

One of the chips is chosen in order to subsequently use its 100 noisy measurements so that one can estimate the parameters of the random noise component in the transform domain.

A specified transform (decorrelation matrix) is applied to noisy RO outputs in order to obtain a set of 100 different values for each noisy transform coefficient.

Each of the 100 noisy transform coefficients is subtracted from each of the 100 noiseless transform coefficients obtained in the second step above, yielding 100 resultant noise samples per transform coefficient.

Mean and variance values for each noise component on each transform coefficient are estimated from the 100 resultant noise samples.

After estimating the mean and the variance for both noiseless transform coefficients and noise components, where a noisy transform coefficient output=noiseless transform coefficient+noise component on the transform coefficient, average bit error probabilities are calculated using following (Monte-Carlo simulation) steps:

Generate noiseless and noisy transform coefficient outputs according to the estimated mean and the variance values for each noiseless transform coefficient and each noise component, respectively.

Obtain noisy transform coefficients from the generated noiseless transform coefficient outputs and the generated noise components.

Quantize the noiseless and noisy transform coefficient outputs into decimal values, after calculating Gaussian quantiles, dividing the range of each transform coefficient into equi-probable quantization regions, by using the mean and the variance values for each noiseless transform coefficient and each noise component.

Map the decimal values via a Gray mapping with a corresponding quantized-bit-output length L (e.g., L=3), yielding mapped length-L bit sequences.

Compare the mapped values in order to estimate the average bit error probability for each decorrelation matrix.

Figure 3:
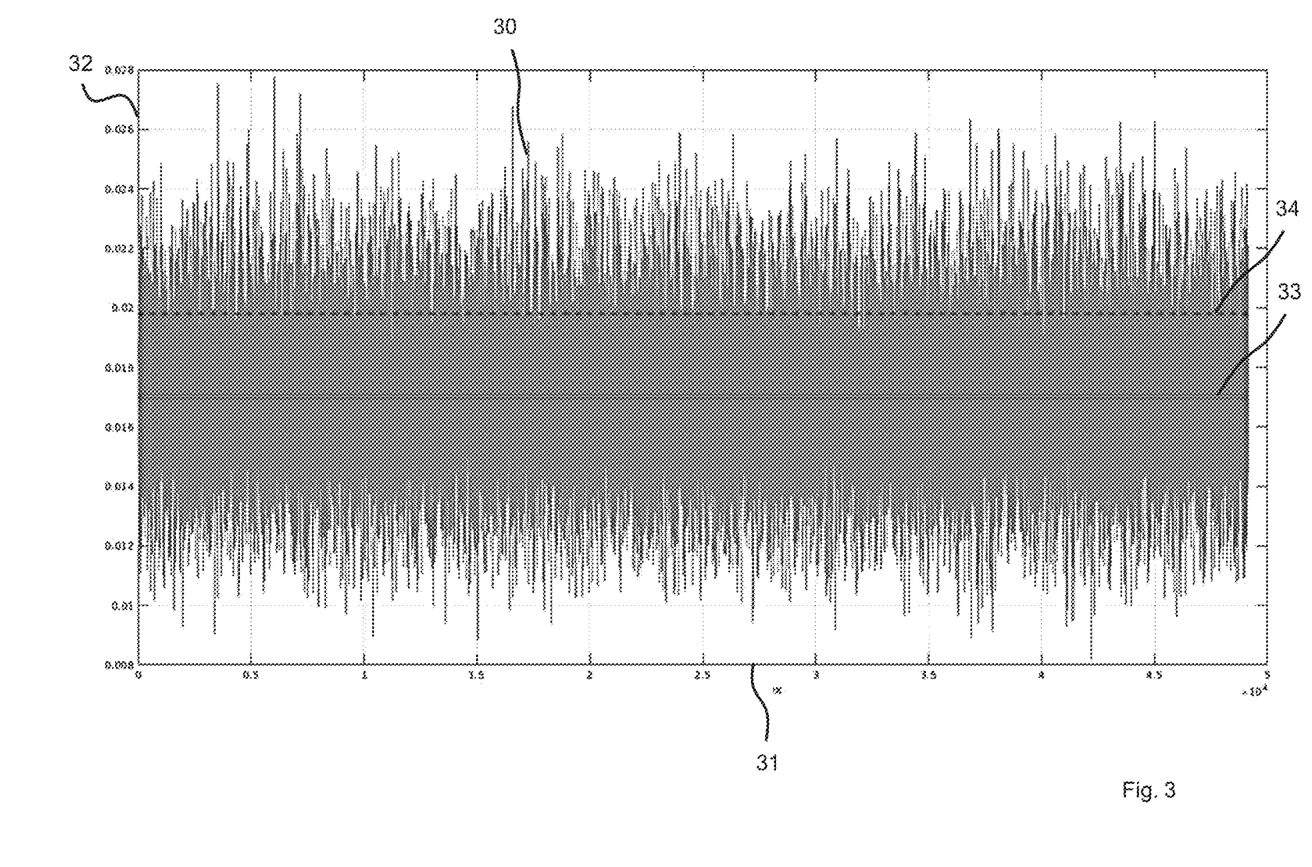
FIG. 3 a graphical representation of average bit error probabilities for different generated decorrelation matrices.

FIG. 3 shows a graphical representation of the average bit error probabilities 30 for different generated decorrelation matrices. Each generated decorrelation matrix is associated with an index on an x-axis 31. A y-axis 32 represents magnitudes of the average bit error probabilities 30 for each index i/decorrelation matrix.

The average bit error probabilities 30 vary significantly for the generated decorrelation matrices. For L=3, an overall average bit error probability 33, obtained by further averaging over all decorrelation matrices is 0.017, which is smaller than a DCT average bit error probability 34 of 0.0199, which was the best result in the RO-PUF literature until now, obtained by employing a discrete cosine transform/DCT matrix as the decorrelation matrix.

The smallest value of average bit error probabilities 30 (associated with a lowest-error decorrelation matrix) is 0.0081, which is significantly smaller than the average error probability values obtained by DCT, KLT, DWHT, or DHT. To illustrate a gain in secret-key capacity due to such a smaller error probability value, the capacity for the DCT case is calculated as 0.8591 bits and for the lowest-error decorrelation matrix as 0.9321 bits. This further gain in secret-key capacity can be used to increase a channel code rate or to employ a simpler decoder for fixed channel codes.

The lowest-error-probability decorrelation matrix is:

$$\begin{pmatrix}
-1 & 1 & 1 & -1 & 1 & -1 & -1 & 1 & 1 & -1 & -1 & 1 & 1 & -1 & -1 & 1 \\
1 & 1 & -1 & -1 & -1 & -1 & 1 & 1 & -1 & -1 & 1 & 1 & -1 & -1 & 1 & 1 \\
-1 & 1 & -1 & 1 & 1 & -1 & 1 & -1 & 1 & -1 & 1 & -1 & 1 & -1 & 1 & -1 \\
1 & 1 & 1 & 1 & -1 & -1 & -1 & -1 & -1 & -1 & -1 & -1 & -1 & -1 & -1 & -1 \\
1 & -1 & -1 & 1 & 1 & -1 & -1 & 1 & 1 & -1 & -1 & 1 & -1 & 1 & 1 & -1 \\
-1 & -1 & 1 & 1 & -1 & -1 & 1 & 1 & -1 & -1 & 1 & 1 & 1 & 1 & -1 & -1 \\
1 & -1 & 1 & -1 & 1 & -1 & 1 & -1 & 1 & -1 & 1 & -1 & -1 & 1 & -1 & 1 \\
-1 & -1 & -1 & -1 & -1 & -1 & -1 & -1 & -1 & -1 & -1 & -1 & 1 & 1 & 1 & 1 \\
1 & -1 & -1 & 1 & 1 & -1 & -1 & 1 & -1 & 1 & 1 & -1 & 1 & -1 & -1 & 1 \\
-1 & -1 & 1 & 1 & -1 & -1 & 1 & 1 & 1 & 1 & -1 & -1 & -1 & -1 & 1 & 1 \\
1 & -1 & 1 & -1 & 1 & -1 & 1 & -1 & -1 & 1 & -1 & 1 & 1 & -1 & 1 & -1 \\
-1 & -1 & -1 & -1 & -1 & -1 & -1 & -1 & 1 & 1 & 1 & 1 & -1 & -1 & -1 & -1 \\
1 & -1 & -1 & 1 & -1 & 1 & 1 & -1 & 1 & -1 & -1 & 1 & 1 & -1 & -1 & 1 \\
-1 & -1 & 1 & 1 & 1 & 1 & -1 & -1 & -1 & -1 & 1 & 1 & -1 & -1 & 1 & 1 \\
1 & -1 & 1 & -1 & -1 & 1 & -1 & 1 & -1 & 1 & -1 & 1 & -1 & 1 & -1 & 1 \\
-1 & 1 & -1 & -1 & 1 & 1 & 1 & 1 & -1 & -1 & -1 & -1 & -1 & -1 & -1 & -1
\end{pmatrix}.$$

The lowest-error-probability decorrelation matrix does not comprise an obvious structure or relation to DCT, DWHT, KLT, or DHT matrices. This illustrates an advantage of generating decorrelation matrices as presently disclosed since signals from physical identifiers perform significantly better in terms of reliability. Still, due to only using entries that are 1 or −1 and employing an adapted selection for generating the decorrelation matrices, a small hardware area for implementation is ensured.

The features disclosed in this specification, the figures and/or the claims may be material for the realization of various embodiments, taken in isolation or in various combinations thereof.

The invention claimed is:

1. A method for decorrelating input signals from a physical identifier, in a system having one or more processors, comprising:
providing input signals from a physical identifier being a physical unclonable function;
providing a decorrelation matrix;
generating output signals, comprising decorrelating the input signals by applying the decorrelation matrix to the input signals; and
providing the output signals at an output;
wherein the providing of the decorrelation matrix comprises
providing an initial matrix, the initial matrix being an orthogonal matrix; and
determining the decorrelation matrix from the initial matrix by at least once selecting and applying at least one of a plurality of matrix extensions on the initial matrix, wherein each of the plurality of matrix extensions generates, from an input orthogonal matrix, a further orthogonal matrix with higher matrix dimension than the input orthogonal matrix, wherein the determining of the decorrelation matrix from the initial matrix comprises adaptively selecting at least one of the plurality of matrix extensions dependent on the input signals.

2. The method according to claim 1, wherein the initial matrix is a 2×2 matrix.

3. The method according to claim 1, wherein for each matrix extension of the plurality of matrix extensions, the input orthogonal matrix is a k×k matrix and the output further orthogonal matrix is a 2 k×2 k matrix, k being a positive integer.

4. The method according to claim 2, wherein the decorrelation matrix determined from the initial matrix is a $2^n \times 2^n$ matrix, n being a positive integer.

5. The method according to claim 1, wherein the plurality of matrix extensions comprises following transformations:
$A \mapsto [A, A; A, -A]$,
$A \mapsto [A, A; -A, A]$,
$A \mapsto [A, -A; A, A]$,
$A \mapsto [-A, A; A, A]$,
$A \mapsto [A, A; A, -A]$,
$A \mapsto [A, A; -A, A]$,
$A \mapsto [A, -A; A, A]$, and
$A \mapsto [-A, A; A, A]$,
wherein A is the input orthogonal matrix.

6. The method according to claim 1, wherein the initial matrix is composed of matrix entries that are 1 or −1.

7. The method according to claim 6, wherein the initial matrix is [1, 1; 1, −1].

8. The method according to claim 1, wherein the output signals are post-processed.

9. A system for decorrelating input signals from a physical identifier, comprising one or more processors, wherein the one or more processors are configured to provide the following:
provide input signals from a physical identifier being a physical unclonable function;
provide a decorrelation matrix;
generate output signals, comprising decorrelating the input signals by applying the decorrelation matrix to the input signals; and
provide the output signals at an output;
wherein the one or more processors are further configured for, in the step of providing the decorrelation matrix,
providing an initial matrix, the initial matrix being an orthogonal matrix; and
determining the decorrelation matrix from the initial matrix by at least once selecting and applying at least one of a plurality of matrix extensions on the initial matrix, wherein each of the plurality of matrix extensions generates, from an input orthogonal matrix, a further orthogonal matrix with higher matrix dimension than the input orthogonal matrix, wherein the determining of the decorrelation matrix from the initial matrix comprises adaptively selecting at least one of the plurality of matrix extensions dependent on the input signals.

* * * * *